Feb. 12, 1957  R. N. BROWN  2,780,940
FLOATED GYRO
Filed Nov. 15, 1954  2 Sheets-Sheet 2
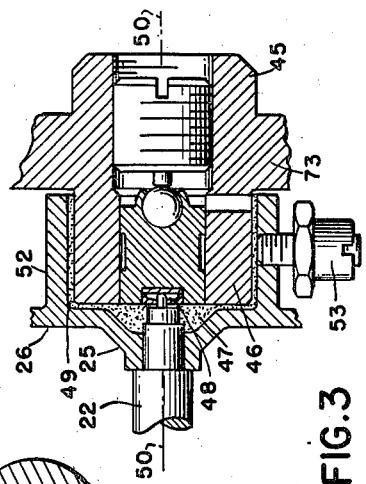
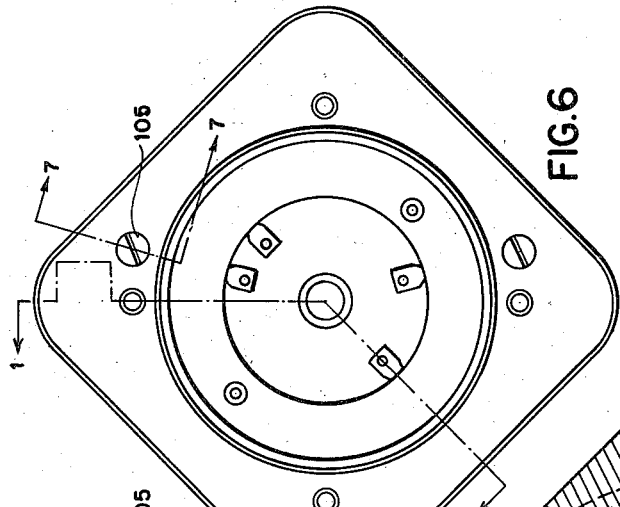
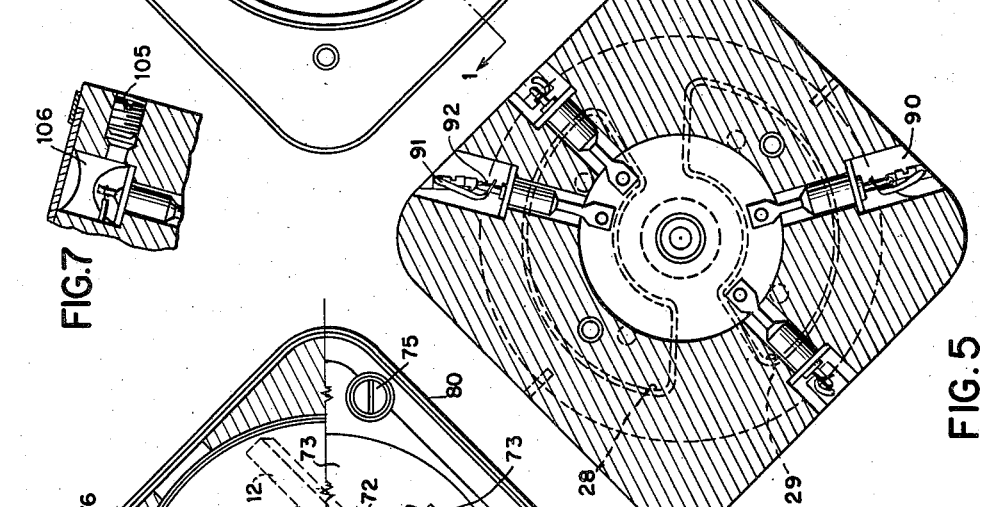
INVENTOR.
Robert N. Brown
BY
ATTORNEY United States Patent Office 2,780,940
Patented Feb. 12, 1957

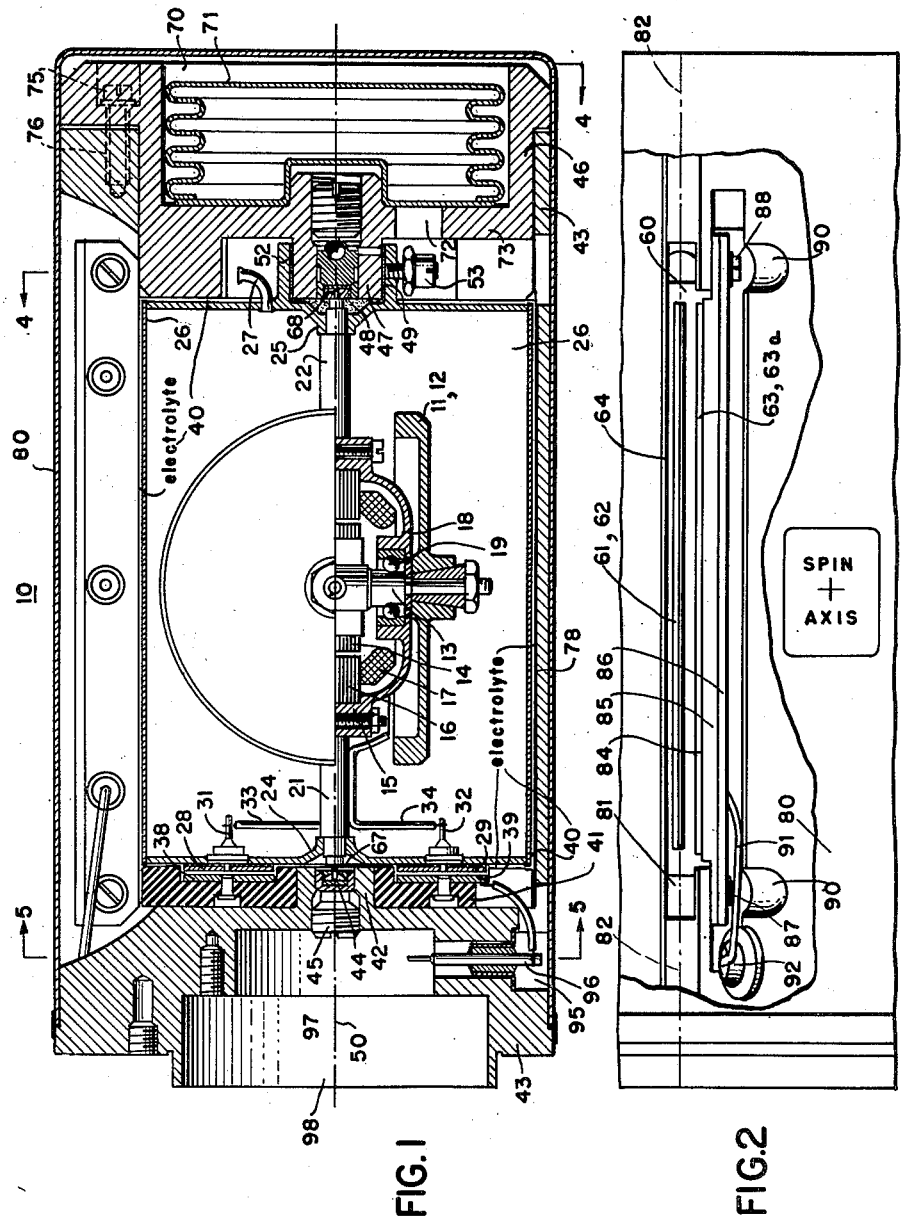

2,780,940

FLOATED GYRO

Robert N. Brown, Verona, N. J., assignor to Kearfott Company, Inc., Little Falls, N. J., a corporation of New York Application November 15, 1954, Serial No. 468,743

5 Claims. (Cl. 74—5.7)

This invention relates to gyroscopic devices, that are suitable for use as gyroscopic instruments, and it relates particularly to a hermetically sealed floated gyro, in which the floating medium is electrically conductive, in order, first, to serve to conduct electric current to an electric spin motor for the gyro wheel, and, second, to constitute a potentiometer resistor for controlling an external circuit in accordance with precession movements of the gyro.

One object of this invention is to provide a gyro hermetically sealed within a drum that is floatingly supported for free rotation about the precession axis of the gyro.

Another object of the invention is to provide a gyro device including a liquid medium which constitutes an electrolyte to conduct operating current to a driving or spin motor for the gyro, both the gyro and the motor being hermetically sealed within a drum that is floatingly supported on the fluid electrolyte.

One important field of use for such gyroscopic devices is in aircraft. Minimum weight becomes an important matter. Consequently, size and volumetric space must be reduced to a minimum. During steady operating conditions in such a gyro with operating current constantly supplied to the spin motor through the electrolyte, the electrolyte becomes heated and is expanded in volume. The gyro is essentially a sensitive and accurate instrument, and is assembled to accurate and close tolerance. To preserve the accuracy of the gyro, the volumetric expansion of the electrolyte is controlled to prevent the generation of excessive hydraulic internal stresses within the gyro.

Another object of the invention, therefore, in such a floated gyro construction in which the volume of the floated medium changes with temperature, is to prevent excessive hydraulic stress within the gyro casing, that might cause mechanical distortion or undesired displacement of elements of the gyro assembly.

Another object of the invention is to provide a system for floating a hermetically sealed drum containing a spinning gyro, with a simple provision for applying a viscous restraint against precessing movement of the gyro and against the resultant angular movement of the drum.

In the construction of one form of a floated gyro embodying the principles of this invention, a gyro wheel is mounted on an axle which supports the rotatable rotor of a spinning motor. The entire motor and gyro assembly is supported on and between a pair of cantilever arms, all enclosed in a hermetically sealed drum that is floated on a fluid medium and that is pivoted for angular movement about a precession axis of the gyro, to enjoy a single degree of freedom.

The fluid and the drum are disposed in the main chamber of a housing which also includes a communicating auxiliary expansion chamber. An expansible bellows in the auxiliary expansion chamber provides available excess volumetric space, upon compression in response to expansion of the fluid, due to increase in its temperature.

The volume and the effective density of the hermetically sealed drum are designed to make such effective density substantially equal to the average density of the electrolyte, for proper floating support. Friction at the pivot bearings is thus reduced to a minimum.

The precession movement of the gyro causes angular movement of the entire drum about the precession axis. The movement of the drum is employed to vary the position of a movable take-off terminal in a gap between two stationary electrodes, the gap and the electrodes being immersed in the fluid medium. The fluid medium is an electrolyte that is electrically conductive, and it serves as a potentiometer resistor in said gap between the two electrodes. The take-off terminal may thus readily establish a voltage take-off point on the potentiometer without any frictional losses. The fluid medium also serves to conduct current to appropriately positioned electrodes on the drum, and insulated therefrom, for transmission to the spin motor.

Another object of this invention is to provide a floated gyro in which various error torques, that are normally found in small gyro devices, may be substantially eliminated.

The construction and manner of operation of one form of floated gyro, constructed to embody the principles of this invention, is shown in the accompanying drawings in which, Figure 1 is a longitudinal sectional view of the gyro assembly;

Figure 2 is a plan view of the region including the stationary and movable electrodes;

Figure 3 is a sectional view of a bearing for the gyro drum, to illustrate the disposition of the viscous damping material;

Figure 4 is a transverse sectional view, taken with portions in different transverse planes;

Figure 5 is a transverse sectional view near one end of the gyro assembly, to show the form and location of the contact terminal plates for supplying operating current to the spin motor for the gyro;

Figure 6 is an end elevational view of the assembly, to show the location of a filling hole and closure screw;

Figure 7 is a sectional view of the region at the screw of Figure 6, to illustrate the nature of access for filling the assembly when closed and hermetically sealed; and Figure 8 is a schematic diagram of the potentiometer gap circuitry, showing how the gap at one vane take-off increases as the gap at the other vane take-off decreases.

As shown in Figure 1, a floated gyro 10 comprises two gyro wheel sections 11 and 12 mounted on an axle 13, which also serves as the shaft for a rotor 14 of an electric spin motor 15 including a stator 16 with suitable energizing windings 17. The spin motor 15 is provided with suitable end-bells 18, of which one end-bell is shown supporting a bearing 19 for the shaft 13 of the motor 15.

The motor 15 is provided with two supporting side arms 21 and 22 whose outer ends are respectively anchored in two corresponding end walls 24 and 25 of a hollow cylindrical drum 26 that serves as a shell to enclose and hermetically seal the motor and gyro assembly.

The drum 26 may be left filled with air or it may be exhausted and an atmosphere of helium or hydrogen substituted within the drum. For that purpose, a small filling tube 27 is provided on the right-hand end wall 25 of the drum, just above the side arm 22.

In order to bring operating current to the windings 17 of the spin motor 15, two arcuate current-receiving or collector terminal plates 28 and 29 are mechanically supported on and insulated from the end wall 24 of the drum. Two terminal pins 31 and 32 are insulatingly mounted on the end wall 24 to bring an electrical connection through that end wall 24 from the current collecting terminal plates 28 and 29 to provide two inside terminal connections for two electrical conductors 33 and 34 that connect to the windings 17 of the motor.

Two stationary feeder terminal plates 38 and 39 are disposed directly opposite the collector terminal plates 28 and 29, respectively. In assembly, the related plates are positioned to be separated by a gap of not more than 0.010 inch.

This gap between the two plates of each set will be bridged and filled in by a conducting fluid electrolyte 40, which will be referred to later. The two feeder plates 38 and 39 are fixed on a stationary ring 41 of insulating material, which is preferably an acid-resisting and alkali-resisting material, such as the commercial material known as Mycalex, for example.

The insulating ring 41 is co-axially supported on a hub 42 that is integrally formed on the initial block of metal from which the housing or casing 43 is originally formed.

Within hub 42 is disposed an axially adjustable jewel bearing 44 to support one end of the drum 26. An adjustable thread screw 45 serves to axially position the bearing 44.

At the other end of the housing 43 is disposed a cup 46 which fits co-axially within the housing 43 with a snug sliding fit of very close tolerance. The cup 46 embodies a small hub 47 which serves to support a jewel bearing 48 co-axially within the hub, to provide support for the other end of the drum 26.

As shown in Figure 1, the hub 47 on the cup 46 serves both to support the jewel bearing 48, and also to provide a supporting outer surface for a viscous damping fluid 49 which engages the adjacent inner surface of a braking cylinder 52 secured to or constituting part of the end wall 25 of the drum 26.

As shown in Figure 1, and in more detail in Figures 3 and 4, the braking cylinder 52 is provided with several adjusting screws as weights 53 for weighting and positioning the density axis of the drum 26 for co-axial and concentric alignment with the axis 50 between bearings 44 and 48.

The drum 26, in Figures 1, 2 and 4, is provided with two vanes 61 and 62 secured longitudinally along the outer surface of the drum on diametrically opposite positions on the drum. Each vane 61, 62 is disposed in a separate space 60, between the oppositely-facing surfaces of an insulated supported fixed plate 63 or 63–a and a wall surface 64, that will permit the vane 61 or 62 to have an angular movement of about three degrees from its insulated plate 63 or 63–a. When the entire housing is filled with the fluid electrolyte 40, the drum 26 will be immersed, and each space 60 will be filled with the electrolyte. The electrolyte in both gaps defines and constitutes an effectively continuous impedance path or potentiometer resistor. In each gap, the electrolyte functions as half of the total potentiometer resistor, and each vane 61 or 62 will serve as a movable contact relative to the insulated plate 63. The two vanes 61 and 62 are mechanically and electrically part of the drum 26. Together they constitute the electrical take-off terminal relative to the two stationary insulated plates 63 and 63–a.

The drum with its motor-driven gyro contents, is supported between the two bearings 44 and 48 by two end pins 67 and 68, that are co-axially fitted into the respective ends of the side arms 21 and 22. The volume of the drum is so dimensioned, with respect to the total weight of the drum and its contents, as to make the density of the entire drum unit substantially equal to the density of the electrolyte 40 which is used to fill the housing of the assembly. Thus, the drum is supported suspended and immersed in the electrolyte with substantially no buoyancy displacing forces on the drum. The drum and its contents are thus supported co-axially in the housing, with minimum friction on the jewels 44 and 48 and on the pivot pins 67 and 68.

The cup 46 shown fitting into the right hand end of the housing 43, in Figure 1, is provided with a recessed cavity or chamber 70, of sufficient depth and space to accommodate a closed compressible bellows 71. The bellows 71 is shown in Figure 1 in its partially expanded position, to occupy nearly all the volumetric space in the chamber 70. The chamber 70 communicates with the main chamber of the housing 43 through a hole 72 in the floor of the cup 46. As shown in Figure 4, there are several such openings 72 in that floor or front wall 73 of the cup 45 that serve the double function of permitting free passage of the electrolyte from the cup chamber 70 to the main chamber in the housing 43, in either direction; and also of providing access to the adjusting screws 53 for shifting the density axis of the drum into concentricity with the physical axis between the two supporting bearings 44 and 48.

On changes in temperature, with resulting changes in volume of the electrolyte 40, the change in necessary volumetric space is provided by the compensating extension or contraction of the sealed bellows 71 sealed in the cup 46.

The cup 46 is held in fixed position in the end of the housing 43 by suitable anchoring bolts that fit into suitably threaded holes 76 in thicker end portions of the housing 43 adjacent to corners.

A housing cover 80 encloses the operating elements of the unit and is hermetically sealed to the body case 43, to contain the electrolyte.

In order to avoid and prevent any chemical action between the electrolyte and the housing 43, those inner surfaces of the housing that might be engaged by the electrolyte are preferably insulated. For this purpose, a thin layer of suitable acid-resisting and alkali-resisting enamel 78 is fired on the appropriate inner surfaces of the housing 43.

The electrolyte 40, employed both as a floating medium and a conducting medium, should have a relatively high resistivity. Thus, as shown in Figure 4, with the gap distance between the oppositely facing surfaces 63 and 64, relatively short, and even with the relatively long and deep terminal areas, the resistance may be substantial between those two terminal surfaces 63 and 64.

The movable vane 61 that is secured to and supported on the rim of the floated drum 26 thus serves as a movable contact terminal in the gap, to serve as a pick-off terminal to take off the potential at any point along the path in that gap between the two surfaces 63 and 64.

The general construction and arrangement of the two surfaces that act as the terminal surfaces for the electrolyte in the cap are indicated in more detail in Figures 2 and 4.

As shown in Figures 2 and 4, a portion of the housing cover 80 is broken away to expose a substantial end of the housing 43 at and along a top corner. A slot 81 in the housing material is parallel to and straddles the corner line 82, to provide the inner facing surface 64 that constitutes one terminal surface of the gap in which the electrolyte serves as a potentiometer. The other surface 63, as a terminal surface of the gap, is provided by a bar 84 supported on an insulating strip 85 that is secured to a backing strip 86. The entire unit, consisting of the terminal bar 85, the insulating strip 84 and the backing bar 86, is anchored on the housing 43 by two bolts 87 and 88. Access to those two fastening bolts 87 and 88 is provided by the formation of a drilled groove 90 into the side wall on the housing 43 at a region directly behind the area where the fastening screws 87 and 88 will be inserted to anchor the terminal strip. A conductor 91 connects bar 84 to a terminal 92 for connection to an external circuit.

In Figure 3 is shown a vertical section through the supporting hub 46 that contains the bearing for the right-hand end of the hollow drum 26. The hub 46 is concentric and integral on the cup 45 and supports the layer 49 of rubbery silicone fluid that engages the braking drum 52 at the right-hand end of the hollow drum 26.

The rubbery silicone fluid is a relatively thin film, on the order of 0.010 inch in thickness, and provides the viscous damping resistance against angular movement of the hollow drum 26, when the drum tends to move in response to precessive movement of the gyro wheel within the drum.

At the left hand end of the assembly shown in Figure 1, the main housing 43 is provided with suitable pockets 95 to accommodate hermetically sealed-in terminals 96 for suitable connection to external circuits.

The housing 43 is otherwise provided with co-axial recesses 97 and 98 to provide spaces for accommodating suitable pick-off devices for generating signals proportional to the angular movement of the drum and the gyro during precessive movements, or for other similar equipment that is to co-operate with the gyro.

The dimensions of the chamber in housing 43, for accommodating the floated drum 26, are such as to leave space for a film of the electrolyte to a thickness of about 0.010 inch.

By the use of the closed sealed bellows, the volume of electrolyte required may be reduced to a minimum.

As shown in Figure 8, when the shell 26 is in neutral position, the two gaps, from vane 61 to plate 63 and from vane 62 to plate 63a, are equal. The total path through the electrolyte in both gaps, in series, constitutes the potentiometer, as between conductors 63 and 63a. The take-off point, electrically connected to shell 26 is shown at mid-point. As the shell is angularly displaced by precession of the gyro, one gap increases while the other gap decreases. The effective take-off point thus shifts position along the potentiometer between conductors 63 and 63a without mechanical friction.

The numerals at the ends of the arrowed section lines identify the figures in which the reference views are shown.

In Fig. 7, taken along line 7—7 of Fig. 6, is shown a removable screw 105 for closing a port-hole through which the electrolyte is introduced after the device is otherwise assembled and closed. The electrolyte moves through the opening for the screw 105 into the open space 106, and thence into the main compartment.

What is claimed is:

1. A gyroscopic apparatus comprising a gyro wheel; a motor to spin the gyro wheel; a hollow cylindrical shell with a longitudinal axis enclosing the gyro wheel and the spin motor, and having two co-axial trunnions for pivotally supporting the shell about its axis; a hollow housing for accommodating the shell and its contents, said housing including end walls respectively provided with co-axial supporting hub elements; co-axial bearing means in the two hub elements for supporting the two co-axial trunnions; and an electrolyte filling the housing and immersing the shell to provide a displacement supporting force substantially equal to the weight of the shell and its contents, and being of film thickness between the shell and the housing over the major portion of the circumferential area of the shell and over the entire areas of the two ends walls of the shell to permit the housing to be of minimum volume to enclose the shell.

2. A gyro as in claim 1, comprising further, a pair of stationary spaced electrodes of arcuate shape supported on one end wall of the housing and concentric with said longitudinal axis and insulated from said housing, and having their surface areas in contact with the electrolyte, to deliver operating energy to the spin motor; a second pair of arcuately spaced arcuate electrodes supported on an end wall of said shell and disposed opposite to and in axial alignment with said stationary electrodes, and separated normally from said stationary electrodes by a minimum gap filled with said electrolyte, said second pair of electrodes serving as collectors for the current circuit from the stationary electrodes to the spin motor.

3. A floated gyro as in claim 1, comprising further, co-axial hubs on the housing end-walls and axially hollow to receive and support said bearings means for said trunnions; a co-axial ring on one end wall of the shell and disposed to extend axially beyond one trunnion and to encircle the hub of the adjacent end wall of the housing; and weighting means supported on said co-axial ring and radially adjustable relative to said axis to statically balance the shell with respect to said axis.

4. A floated gyro as in claim 3, including, further, a film of friction material between said co-axial ring and said hub encircled by said co-axial ring, to introduce viscous damping action between the hub and the ring, to damp any angular movement of the shell in response to precession of the gyro.

5. A gyro as in claim 1, comprising further, means supported on the housing to constitute a pair of electrodes disposed adjacent the periphery of the shell and angularly spaced around the axis of the shell, with each electrode face in a flat radial plane passing through the axis; and a radial vane supported on the shell and movable with the shell through a limited angle within the gap between the pair of electrodes, said radial vane serving as a pick-off terminal, and the electrolyte between the pair of electrodes serving as a potentiometer.

References Cited in the file of this patent
UNITED STATES PATENTS

| | | |
|---|---|---|
| 794,654 | Anschutz-Kaempfe | July 11, 1905 |
| 1,589,039 | Anschutz-Kaempfe | June 15, 1926 |
| 2,585,024 | Lundberg | Feb. 12, 1952 |